United States Patent
Scott et al.

(10) Patent No.: US 12,072,865 B2
(45) Date of Patent: Aug. 27, 2024

(54) COMPETING UPDATES FROM MULTIPLE SERVICING INSTANCES

(71) Applicant: Intuit Inc., Mountain View, CA (US)

(72) Inventors: Glenn Carter Scott, Los Altos Hills, CA (US); Michael Richard Gabriel, Milpitas, CA (US)

(73) Assignee: Intuit Inc., Mountain View, CA (US)

( * ) Notice: Subject to any disclaimer, the term of this patent is extended or adjusted under 35 U.S.C. 154(b) by 294 days.

(21) Appl. No.: 17/217,309

(22) Filed: Mar. 30, 2021

(65) Prior Publication Data

US 2022/0300478 A1   Sep. 22, 2022

Related U.S. Application Data

(60) Provisional application No. 63/162,065, filed on Mar. 17, 2021.

(51) Int. Cl.
*G06F 16/00* (2019.01)
*G06F 16/21* (2019.01)
*G06F 16/23* (2019.01)

(52) U.S. Cl.
CPC ........ *G06F 16/2329* (2019.01); *G06F 16/211* (2019.01); *G06F 16/219* (2019.01); *G06F 16/2365* (2019.01)

(58) Field of Classification Search
CPC .. G06F 16/2329; G06F 16/219; G06F 16/211; G06F 16/2365
USPC ........................................................ 707/695
See application file for complete search history.

(56) References Cited

U.S. PATENT DOCUMENTS

| | | | | |
|---|---|---|---|---|
| 6,055,413 A | * | 4/2000 | Morse | H04L 12/1895 340/7.43 |
| 6,490,597 B1 | * | 12/2002 | Singh | G06F 16/2329 |
| 7,617,175 B1 | * | 11/2009 | Mouton, Jr. | G06F 11/1433 707/999.102 |
| 8,667,057 B1 | * | 3/2014 | Adya | H04L 67/5683 709/219 |
| 8,713,098 B1 | * | 4/2014 | Adya | H04L 67/1004 707/777 |
| 8,745,638 B1 | * | 6/2014 | Adya | H04L 67/148 719/318 |
| 8,930,318 B1 | * | 1/2015 | Petkov | G06F 11/1407 707/649 |

(Continued)

FOREIGN PATENT DOCUMENTS

| | | | | |
|---|---|---|---|---|
| CN | 107608689 A | * | 1/2018 | G06F 8/65 |
| EP | 1720303 A2 | * | 11/2006 | H04W 40/02 |
| EP | 1841150 A1 | * | 10/2007 | H04W 40/02 |

*Primary Examiner* — Jean M Corrielus
(74) *Attorney, Agent, or Firm* — Lathrop GPM LLP

(57) ABSTRACT

A method services competing updates from multiple servicing instances. An update message is received by a class of a plurality of classes that service an object. The update message includes an update to the object and an expected version for the object. A version match is determined between the expected version and a current version of the object. When the version match is successful, the update is applied to the object. A response message including the current version of the object is generated. The response message is transmitted. When the update is successfully applied, the response message is transmitted as a success message. When the update is not successfully applied, the response message is transmitted as a failure message.

17 Claims, 10 Drawing Sheets

(56) References Cited

U.S. PATENT DOCUMENTS

| | | | | |
|---|---|---|---|---|
| 9,015,837 B1* | 4/2015 | De Los Reyes | G06F 8/65 | 717/172 |
| 9,038,046 B2* | 5/2015 | Robertson | G06F 8/65 | 717/166 |
| 10,019,255 B1* | 7/2018 | Greenfield | G06F 11/1433 | |
| 11,126,610 B1* | 9/2021 | Deshpande | G06F 16/2365 | |
| 2002/0177437 A1* | 11/2002 | Chesavage | H04L 41/0233 | 455/461 |
| 2005/0053011 A1* | 3/2005 | Ohbayashi | H04W 40/02 | 370/252 |
| 2006/0236083 A1* | 10/2006 | Fritsch | H04L 67/34 | 713/1 |
| 2008/0071816 A1* | 3/2008 | Gray | H04L 67/55 | |
| 2009/0063582 A1* | 3/2009 | Anna | G06Q 10/107 | 707/999.203 |
| 2009/0113072 A1* | 4/2009 | Little | H04L 67/63 | 709/244 |
| 2009/0307678 A1* | 12/2009 | Wu | G06F 8/65 | 717/168 |
| 2011/0099545 A1* | 4/2011 | Lee | H04Q 11/0067 | 717/172 |
| 2012/0110564 A1* | 5/2012 | Ran | G06F 8/65 | 717/173 |
| 2012/0144379 A1* | 6/2012 | Tsai | G06F 8/71 | 717/170 |
| 2012/0203825 A1* | 8/2012 | Choudhary | H04L 65/611 | 709/203 |
| 2012/0254848 A1* | 10/2012 | Robertson | G06F 9/44521 | 717/166 |
| 2012/0284637 A1* | 11/2012 | Boyer | G06Q 10/109 | 715/751 |
| 2014/0207737 A1* | 7/2014 | Joo | G06F 16/27 | 707/634 |
| 2018/0218303 A1* | 8/2018 | Cole | G06F 40/216 | |
| 2018/0329938 A1* | 11/2018 | Iyengar | G06F 16/2329 | |
| 2020/0097580 A1* | 3/2020 | Nayak | G06F 16/907 | |
| 2020/0348949 A1* | 11/2020 | Pentland | G06F 9/44536 | |
| 2020/0379983 A1* | 12/2020 | Green | G06F 16/284 | |
| 2021/0157807 A1* | 5/2021 | Panetta | G06F 16/2282 | |
| 2021/0390118 A1* | 12/2021 | Gorkin | H04L 67/1097 | |
| 2022/0287089 A1* | 9/2022 | Singh | H04L 63/10 | |

* cited by examiner

COMPETING UPDATES FROM MULTIPLE SERVICING INSTANCES

CROSS REFERENCE TO RELATED APPLICATIONS

This application claims the benefit of U.S. Provisional Application No. 63/162,065, filed Mar. 17, 2021, which is hereby incorporated by reference herein.

BACKGROUND

Applications read and update data, which may be data about individual people. At a high level, an application may load data from a data source, process the data, update the data, and store the updated data back to the data source. One approach to mediate reading and updating the data is to use an object oriented approach, whereby a class receives messages from a client. The messages request operations on the class, including reading and updating the data accessible by the class and stored on the data store.

An object oriented approach may be implemented in a distributed system by connecting the classes to a broadcast network. The classes listen to the network for messages that may be serviced by the clients. The clients send messages over the broadcast network and listen for replies from the clients. If an appropriate class is listening to the network and is able to answer the message (or service the request), the class may answer the message.

In a distributed system, multiple, independent, competing instances of a class may be listening to the broadcast network and a single message may be serviced by multiple classes operating in the system. For a read request, having multiple classes service a request may be harmless from a data consistency standpoint, though the amount of data moving through the network may increase linearly for each extra class servicing the read request. In contrast, an update request may not be so easy. Servicing a single update message multiple times can lead to overwritten data or successful updates that generate error messages posted to the broadcast network. A challenge is to service requests that update data without compromising data consistency.

SUMMARY

In general, in one or more aspects, the disclosure relates to a method services competing updates from multiple servicing instances. An update message is received by a class of a plurality of classes that service an object. The update message includes an update to the object and an expected version for the object. A version match is determined between the expected version and a current version of the object. When the version match is successful, the update is applied to the object. A response message including the current version of the object is generated. The response message is transmitted. When the update is successfully applied, the response message is transmitted as a success message. When the update is not successfully applied, the response message is transmitted as a failure message.

A system includes a server, with processors and memories, and a class executing on one or more processors of the server. An update message is received by the class. The update message includes an update to the object and an expected version for the object. A version match is determined between the expected version and a current version of the object. When the version match is successful, the update is applied to the object. A response message including the current version of the object is generated. The response message is transmitted. When the update is successfully applied, the response message is transmitted as a success message. When the update is not successfully applied, the response message is transmitted as a failure message.

A method caches addresses. An update message is transmitted to a broadcast address of a class. The update message comprises an update to an object and an expected version for the object. A response message including a unicast address of the class and a current version of the object is received. When the update is successfully applied, the response message is received as a success message. The current version is a hash value generated from a state of the object and the expected version. An address cache is updated to include the unicast address from the response message. A subsequent update message is transmitted to the unicast address. The subsequent update message includes the current version.

Other aspects of the invention will be apparent from the following description and the appended claims.

DETAILED DESCRIPTION

Figure 1A:
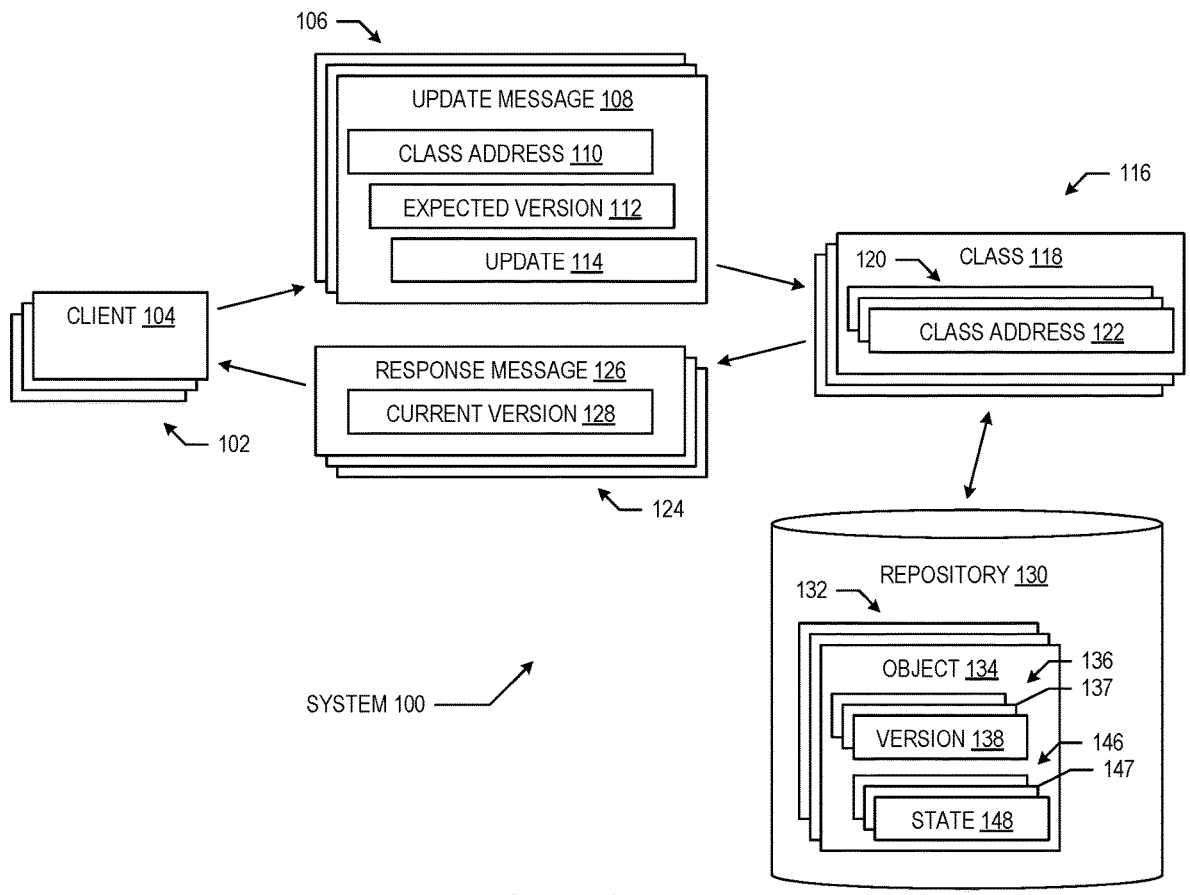
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure service request messages that update data without compromising data consistency. Clients send update messages to classes that update the objects in a repository. A client may send an update message to a broadcast address listened to by multiple classes that compete to update the object. Additionally, a client may send multiple update messages to the unicast addresses of multiple classes that compete to update the object. After attempting to update an object, a class may send a response message or not send any message. The response message may be a success message or failure message to indicate if the object has been successfully updated. Response messages may not be sent even when the object has been updated to reduce the volume of message and amount of traffic on the network connecting the clients, classes, and repositories.

Figure 1B:
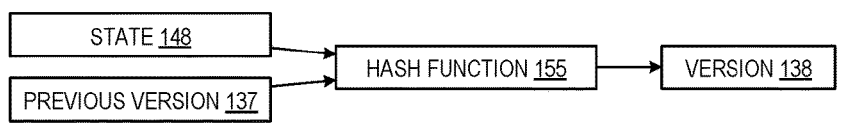
Figure 1C:
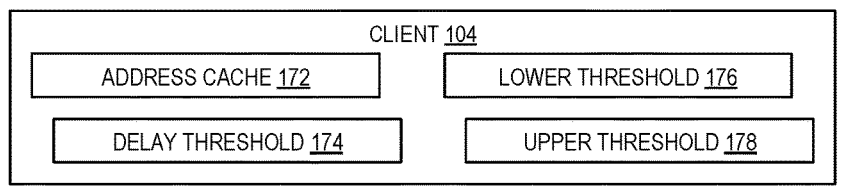

FIGS. 1A, 1B, and 1C, show diagrams of embodiments that are in accordance with the disclosure. FIG. 1A shows a system (100), which handles competing updates from multiple servicing instances. FIG. 1B shows the hash function (155), which generates versions for objects. FIG. 1C shows and describes the address cache (172) of the client (104). The embodiments of FIGS. 1A, 1B, and 1C may be combined and may include or be included within the features and embodiments described in the other figures of the application. The features and elements of FIGS. 1A, 1B, and 1C are, individually and as a combination, improvements to the technology of hash chains and message processing. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Turning to FIG. 1A, the system (100) implements competing updates from multiple servicing instances. The classes (116) service the update messages (106) from the clients (102) by updating the objects (132) in the repository (130). The classes (116) may each attempt to update a single object (e.g., the object (134)) to compete with each other. After attempting to update the objects (132), the classes (116) send the response messages (126) to the clients (102) in response to the update messages (106). The system (100) includes the clients (102), the classes (116) and the repository (130). The system (100) may be implemented using cloud computing environments and multiple servers in accordance with the computing systems and networks described in FIGS. 7A and 7B.

The clients (102) include the client (104) are processes running as part of the system (100) that read and update the data stored in the objects (132) in the repository (130) by sending and receiving messages to and from the classes (116). As an example, the client (104) may be a web application that hosts a website that allows a user to store and update personal information, financial transaction information, etc. The clients (102) send the update messages (106) to the classes (116) and receive the response message (126) from the classes (116). The messages between the clients (102) and the classes (116) may be sent and received using multiple protocols, standards, and interfaces. For example, the messages may be sent and received as part of a representational state transfer application programming interface (RESTful API) using hypertext transfer protocol (HTTP) messages that include text formatted in accordance with JavaScript object notation. Other protocols and standards for communication and data serialization may be used, including remote procedure calls (RPC), protocol buffers (Protobuf), etc. Different ones of the clients (102) may be different instances the same client executable program code that is loaded to different memory areas, servers, cloud computing environments, etc.

The update messages (106) include the update message (108). The update message (108) is sent by the client (104) to the class (118) to update the state (148) of the object (134) of the repository (130). The update message (108) includes the class address (110), the expected version (112), and the update (114).

The class address (110) is a network address to which the class (118) is listening. The class address (110) may be an internet protocol (IP) address and may be a broadcast address or a unicast address. Multiple ones of the classes (116) may listen and respond to messages sent to the broadcast address. A unicast address may correspond to a single class that listens and responds to messages sent to the unicast address.

The expected version (112) identifies the version of the object (134) that the client (104) is attempting to update with the update message (108). For example, the expected version (112) may correspond to (and have the same value as) the version (138) of the versions (136) of the object (134). The versions used by the system (100) may be hash values generated from information stored in the objects as explained in further detail below in FIG. 1B.

The update (114) is the update to be made to the object (134). In one embodiment, the update (114) changes the values of attributes of the object (134) that are stored in the state (148). In one embodiment, the update (114) incorporates a data format using human readable text to define attribute value pairs (e.g., JavaScript object notation (JSON)) that change the attribute value pairs of the state (148) of the object (134). For example, the update (114) may change the "NAME" attribute in the state (148) to the value "James Bond".

The classes (116) include the class (118) are processes that retrieve, send, and update information stored in the objects (132) of the repository (130). The classes (116) listen for the update messages (106) and respond with the response messages (124). The class (118) receives the update message (108), attempts to update the state (148) of object (134) with the update (114), and may send the response message (126). The class (118) includes the class addresses (120). Different ones of the classes (116) may be different instances the same class executable program code loaded to different memory areas, servers, cloud computing environments, etc.

The class addresses (120) include the class address (122) and are network addresses to which the update messages (106) may be sent by the clients (102). The class address (122) may be a unicast address corresponding to the class (118) and the object (134). In one embodiment, the class (118) may listen to multiple unicast and broadcast addresses.

The response messages (124) include the response message (126). The response message (126) is sent by the class (118) to the client (104) in response to the update message (108) after attempting to update the state (148) of the object (134) in the repository (130). The response message (126) may be a success message indicating that the update was successful and may be a failure message indicating that the update was not successful. The response message (126) includes the current version (128). The current version (128) identifies the version of the object (134) after the attempt to update the object (134). When the update is not successful and the response message (126) is a failure message, the current version (128) may be the version (138) of the object (134) when the update is successful and the response message (126) is a success message, the current version (128) may be a subsequent version of the object (134) that is generated from an updated state of the object (134) and the version (138). The updated state is the state of the object (134) after the update (114) from the update message (108) is applied to the state (148) of the object (134).

The repository (130) is a computing system that may include multiple computing devices in accordance with the computing system (700) and the nodes (722) and (724) described below in FIGS. 7A and 7B. The repository (130) may be hosted by a cloud services provider. The cloud services provider may provide hosting, virtualization, and data storage services as well as other cloud services and to operate and control the data, programs, and applications that store and retrieve data from the repository (130). The data in the repository (130) may include the objects (132).

The objects (132) include the object (134) and store the information used by the system. As an example, the objects (132) may store personal identifying information of the users of the system (100). The object (134) includes the versions (136) and the states (146). In one embodiment, the object (134) is hash chain with blocks that correspond to the versions (136) and the states (146). For example, the last block of the hash chain may include the state (148) identified by the version (138) and the next to last block of the hash chain may include the previous state (147) identified by the previous version of (137).

The versions (136) include the previous version (137) and the version (138). The previous version (137) corresponds to the previous state (147) and identifies the previous state (147) as the state of the object (134) that was recorded prior to the state (148) being recorded. The version (138) corresponds to the state (148) and it is generated from the previous version of (137) and the state (148) as described below in FIG. 1B. The version (138) identifies the state (148) as the current version of the object (134) prior to the update (114) being applied to the object (134).

The states (146) include the previous state (147) and the state (148). The previous state (147) is the state of the object (134) that was recorded prior to the state (148) being recorded. The previous state (147) is identified by the previous version (137). The state (148) is identified by the version (138) and is the current state of the object (134) prior to the update (114) being applied to the object (134). In one embodiment, the most recent state (the state (148)) is saved in the repository (130) without saving the previous states (e.g., the previous state (147), et al.).

Turning to FIG. 1B, the hash function (155) may be used by the system (100) to generate the versions of the objects from previous versions of objects and form states of the objects. The hash function (155) implements a cryptographic hash algorithm that generates a hash value (138) (also referred to as a digest) from a payload. The payload used by the hash function (155) includes the state (148) and the previous version (137). To generate the subsequent version for the object (134) after the update (114) has been successfully applied, the payload to the hash function would include the updated state of the object (i.e., the state after applying the update (114) to the state (148)) and the version (138). Cryptographic hash algorithms that may be used by the hash function (155) include the MD series of algorithms (MD4, MD5, MD6, etc.), the SHA series of algorithms (SHA-1, SHA-2, SHA-256, SHA-512, etc.), the RIPEMD series of algorithms (RIPEMD, RIPEMD-128, RIPEMD-320, etc.), the Whirlpool algorithm, the BLAKE series of algorithms (BLAKE2s, BLAKE-256, BLAKE3, etc.), etc.

Turning to FIG. 1C, the client (104) that may transmit update messages to broadcast addresses or to unicast addresses. The classes listening to the broadcast addresses may respond with response messages that include unicast addresses for subsequent transmissions from the client (104). The client (104) maintains an address cache with multiple thresholds.

The address cache (172) stores unicast addresses. The unicast addresses stored in the address cache (172) may be for the classes (116) of FIG. 1A.

The delay threshold (174) identifies the length of time that an address may stay in the address cache (172). After the delay threshold (174) is exceeded by an address, the address may be removed from the address cache (172).

The lower threshold (176) identifies a number of addresses in the address cache (172). When the number of addresses meets the lower threshold (176) (e.g., transitions from being above the lower threshold (176) to being below the lower threshold (176)), the client (104) may switch transmission modes from a unicast mode to a broadcast mode. With the unicast mode, the client (104) may transmit an update message to each of the unicast addresses (each corresponding to a different class) capable of updating the object (134). With the broadcast mode, the client (104) may transmit an update message to the broadcast address, which may be listened to and processed by multiple ones of the classes (116) of FIG. 1A.

The upper threshold (178) identifies a number of addresses in the address cache (172). When the number of addresses in the address cache (172) meets the upper threshold (178) (e.g., transitions from being below the upper threshold (176) to being above the lower threshold (176)), the client (104) may switch transmission modes from the broadcast mode to the unicast mode.

A lower threshold and an upper threshold on the number of unicast addresses to use and switches between a broadcast mode and a unicast mode. In the broadcast mode the update message is transmitted to the broadcast address and in the unicast mode the update message is transmitted to the unicast addresses for an object.

Figure 2A:
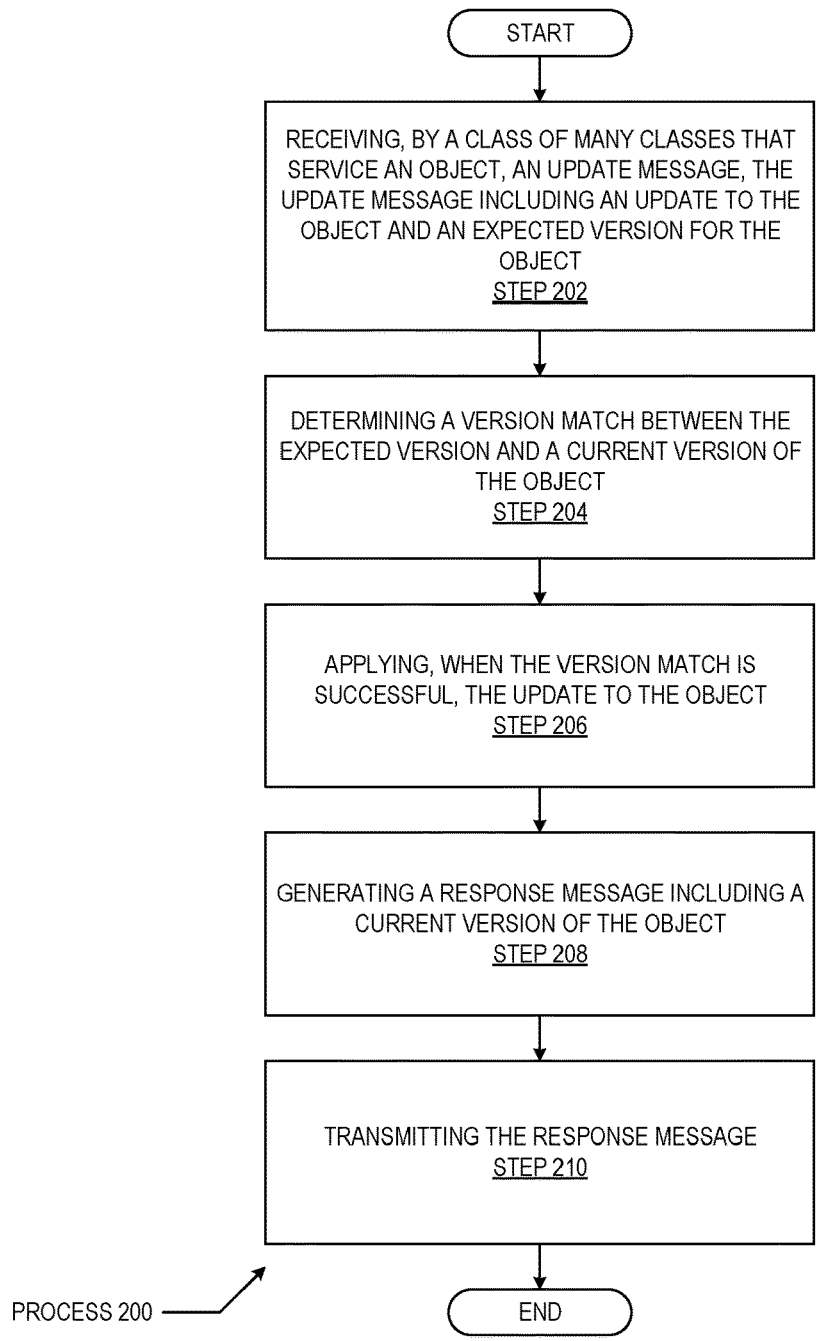
FIG. 2A FIG. 2B, FIG. 3A, FIG. 3B, FIG. 3C, FIG. 4A, FIG. 4B, FIG. 4C, FIG. 4D, and FIG. 5 show flowcharts in accordance with disclosed embodiments.
Figure 2B:
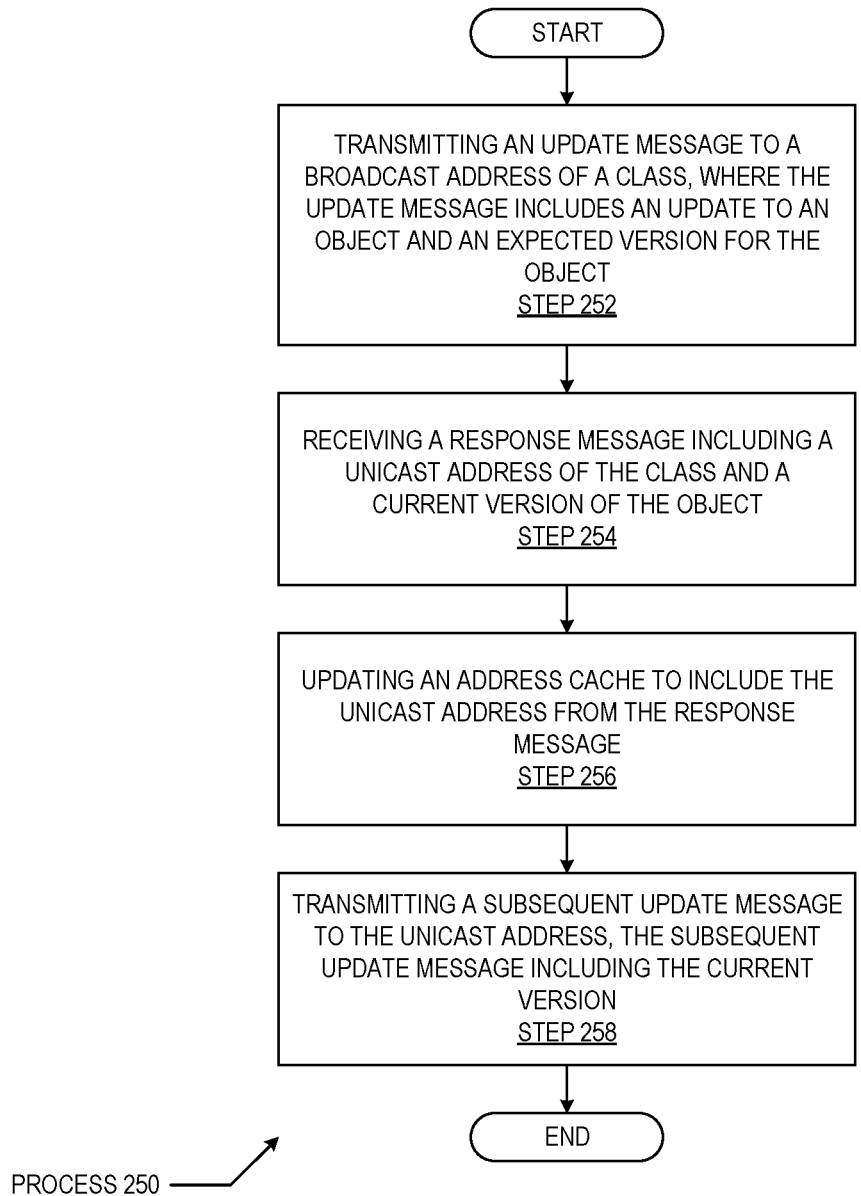
Figure 3B:
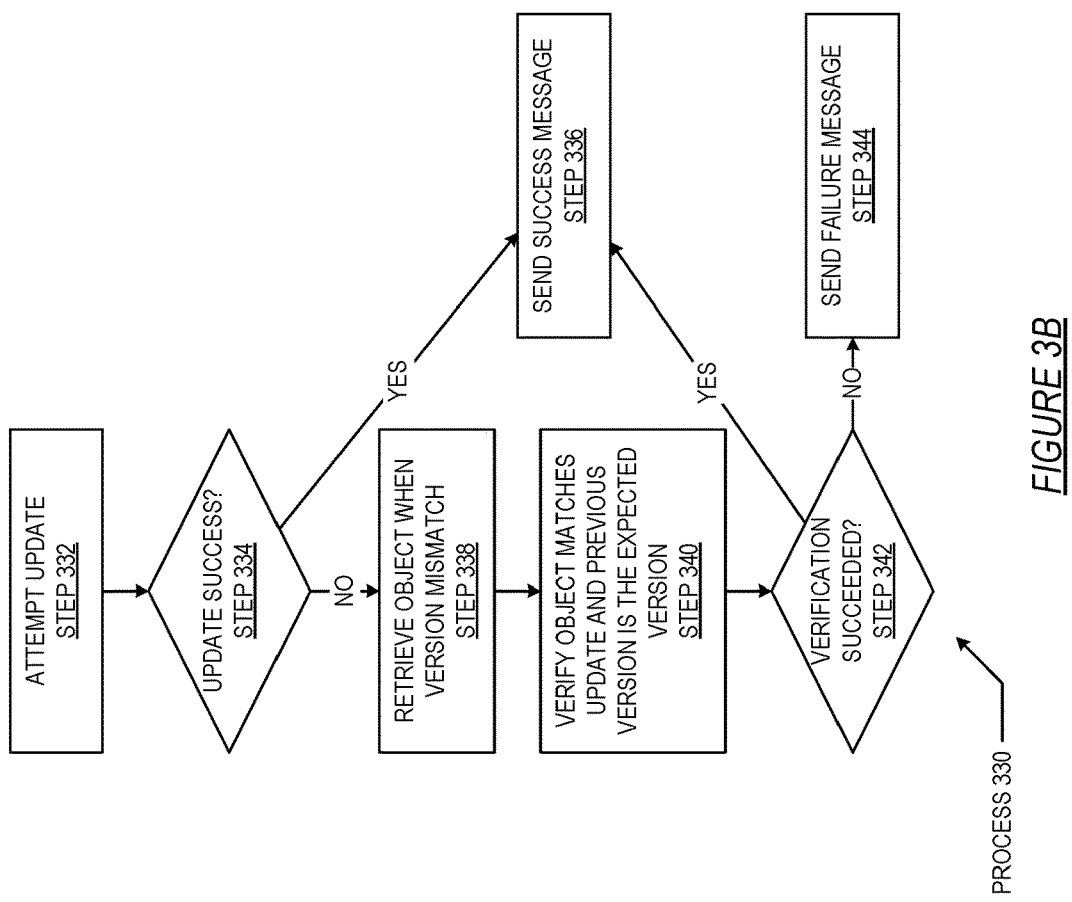
Figure 3A:
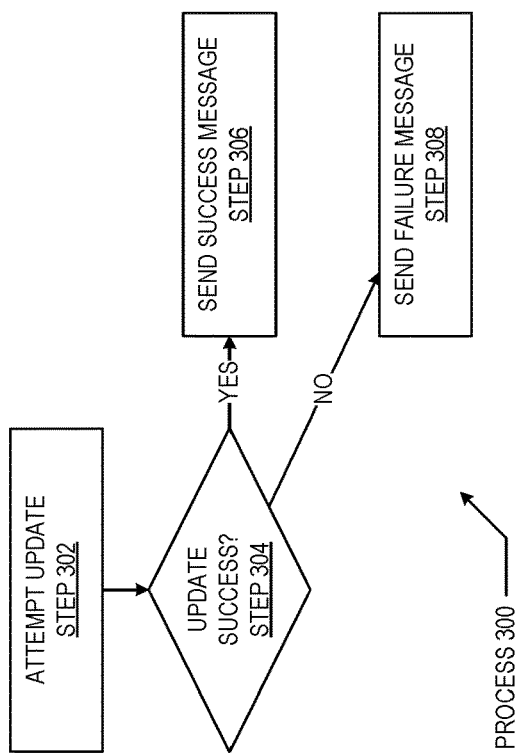
Figure 3C:
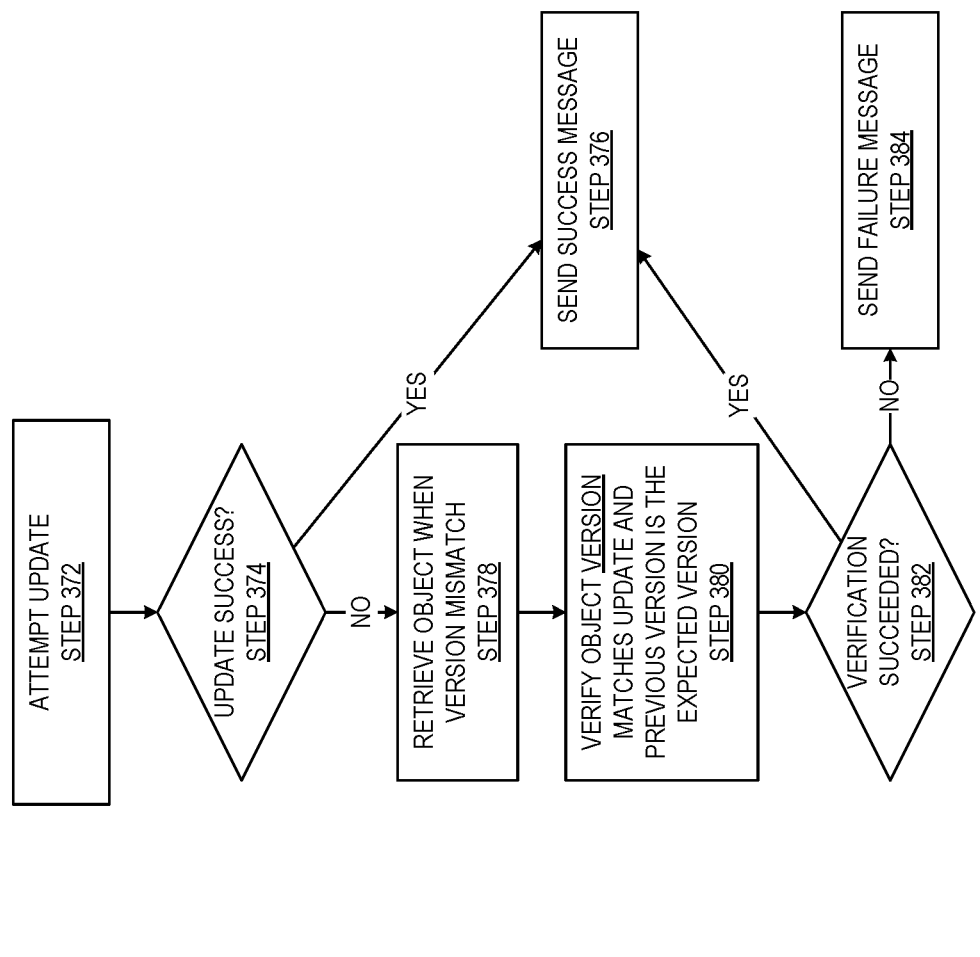
Figure 4B:
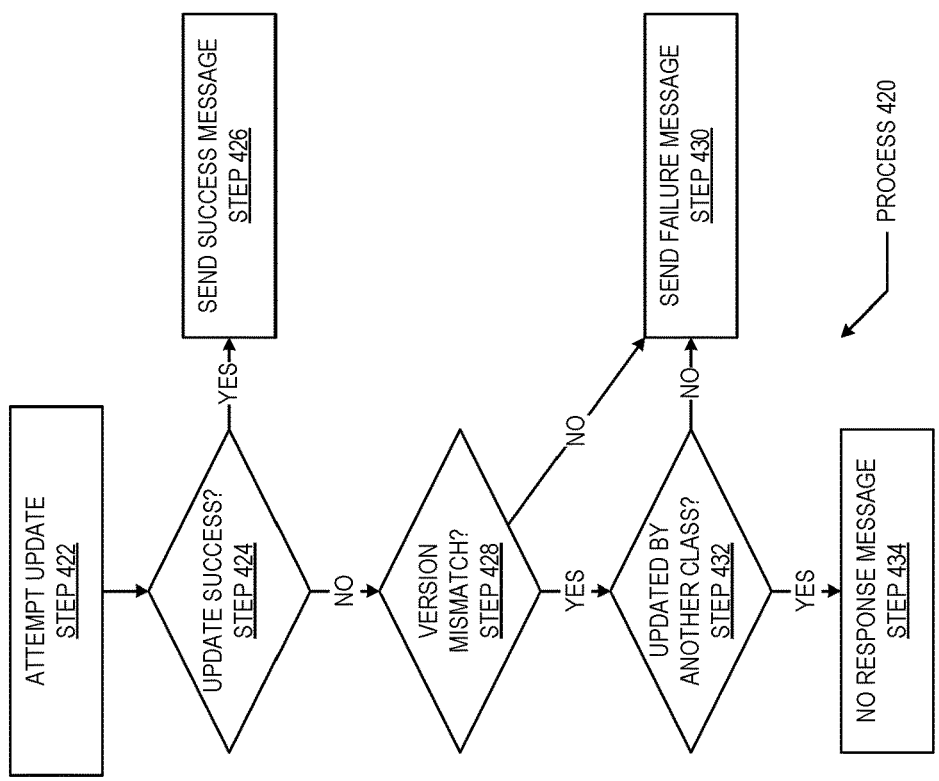
Figure 4A:
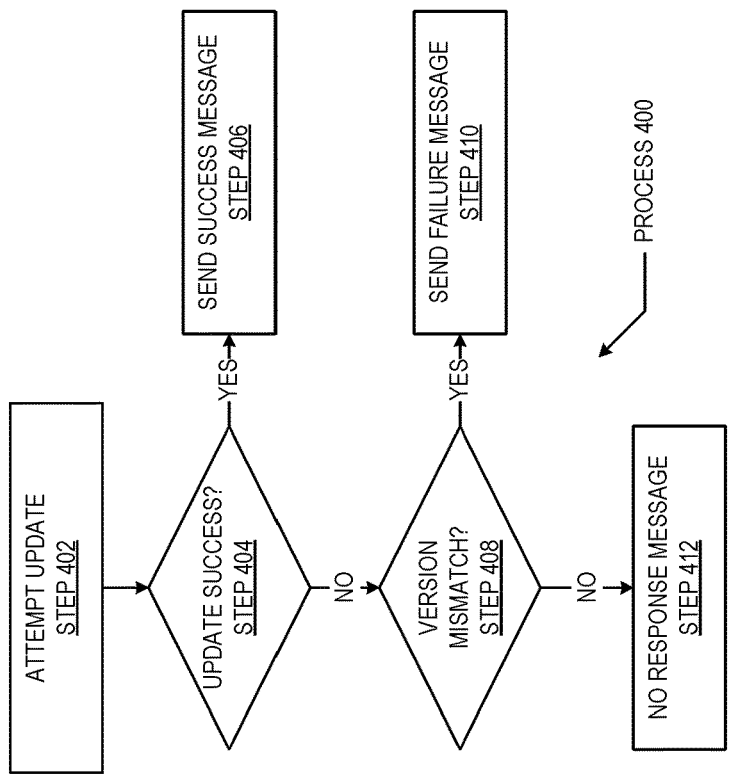
Figure 4D:
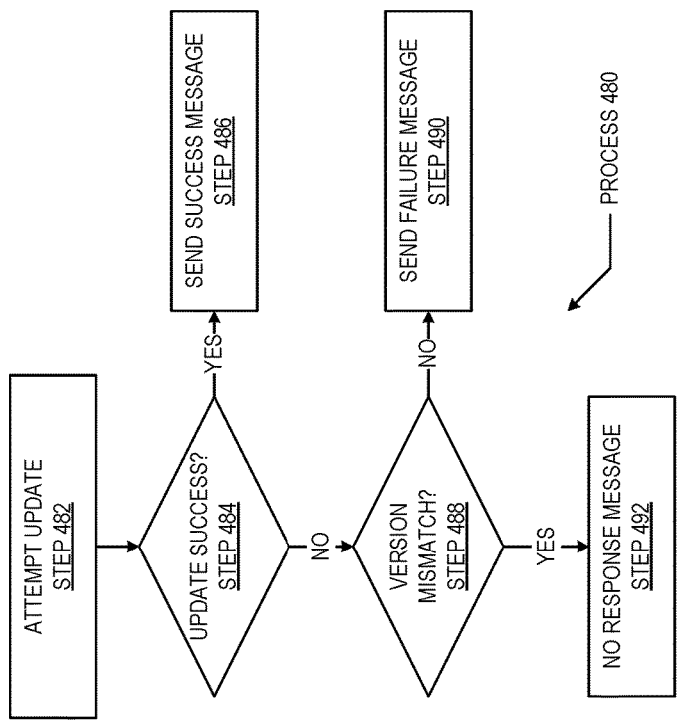
Figure 4C:
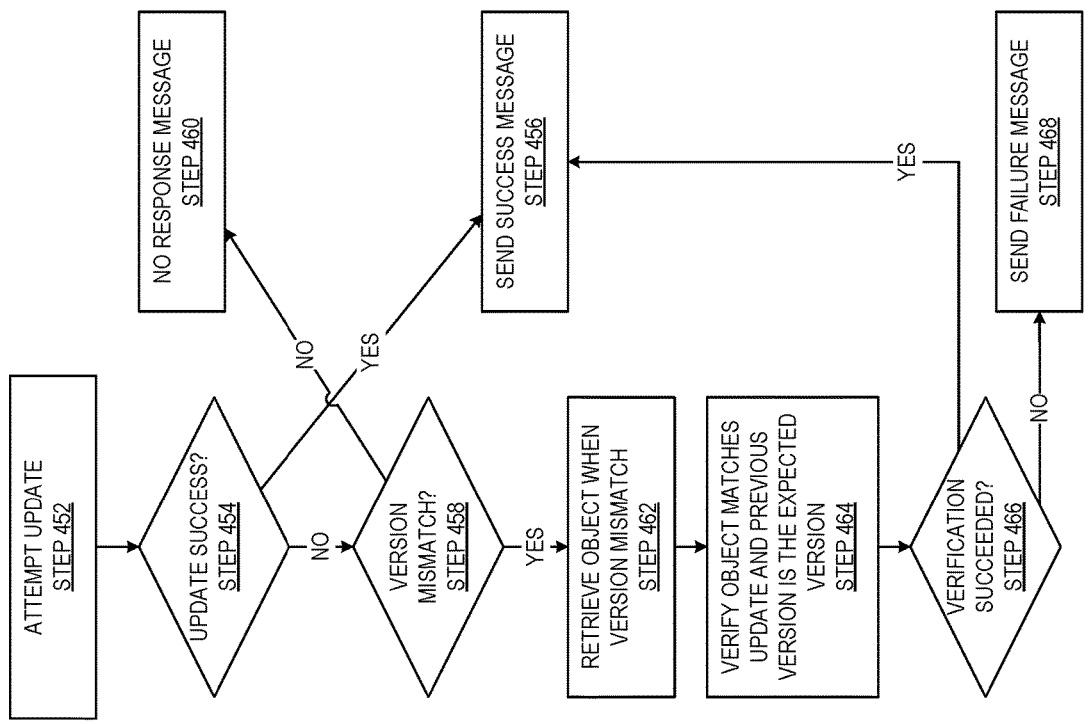
Figure 5:
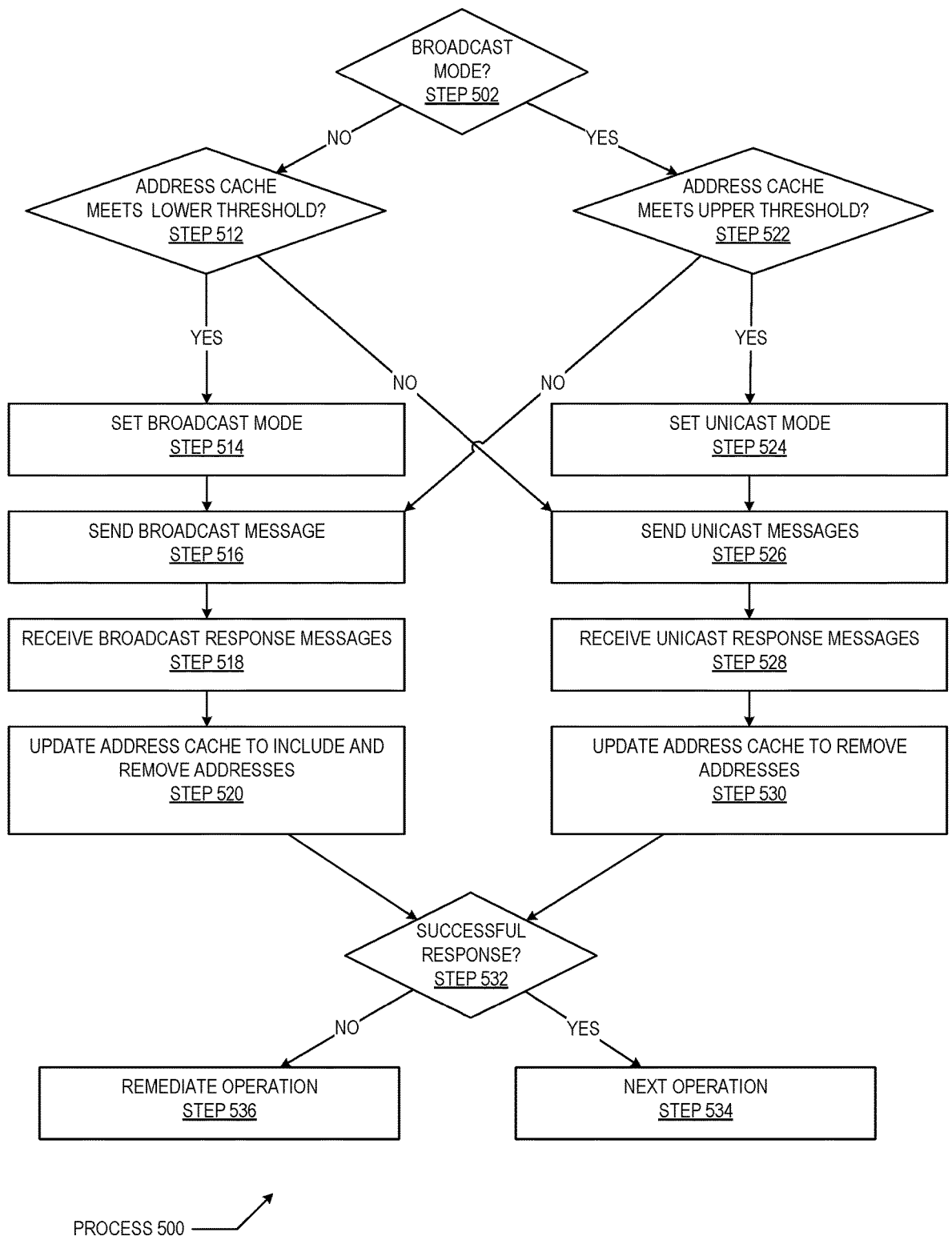

FIGS. 2A, 2B, 3A, 3B, 3C, 4A, 4B, 4C, 4D, and 5 show flowcharts of processes in accordance with the disclosure. FIG. 2A is a flowchart of a method of a class for servicing update messages. FIG. 2B is a flowchart of a method of a client for communicating update messages with classes using broadcast addresses, unicast addresses, and an address cache. FIGS. 3A through 3C show flowcharts of methods of classes for responding to update messages received at a unicast address. FIGS. 4A through 4D show flowcharts of methods of classes for responding to update messages received at a broadcast address. FIG. 5 shows a flow chart of a method of a client for switching between broadcast addresses and unicast addresses when communicating with classes. The embodiments of FIGS. 2A, 2B, 3A, 3B, 3C, 4A, 4B, 4C, 4D, and 5 may be combined and may include or be included within the features and embodiments described in the other figures of the application. The features of FIGS. 2A, 2B, 3A, 3B, 3C, 4A, 4B, 4C, 4D, and 5 are, individually and as an ordered combination, improvements to the technology of hash chains and message processing. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) may be performed by a class on a server in a cloud computing environment. The class may listen to unicast addresses and broadcast addresses for update messages. A particular class that receives an update message may or may not be the class that successfully updates an object. Another class may have updated the object prior to the attempt to update the object by the particular class.

At Step 202, an update message is received by a class that is one of many classes that service an object. The update message includes an update to the object and an expected version for the object. The update message may be received from one of a unicast address and a broadcast address, which may be included in the update message. In one embodiment, the update message is one of multiple update messages sent concurrently from one or more clients. In one embodiment, the update message is received as part of as representational state transfer application programming interface (RESTful API). In one embodiment, the update message is formatted with a data format using human readable text to define data objects with attribute value pairs. In one embodiment, the data format is JavaScript object notation (JSON).

At Step 204, a version match is determined between the expected version and a current version of the object. The expected version and the current version may match when the value of the expected version is equal to the value of the current version. In one embodiment, the current version is generated as a hash value from an updated state of the object and a previous version of the object.

At Step 206, when the version match is successful, the update is applied to the object. When the version match is not successful, the class may not update the object, however, the object may have been updated by another class running on the system.

In one embodiment, when the version match is not successful, a state of the object is verified with the update and a previous version of the object is verified with the expected version to generate a verification. In one embodiment, the verification is successful when the state of the object accords with the update and the previous version of the object matches the expected version for the object from the update message. For example, the update may require an attribute value pair to be updated in the object and the verification may retrieve the attribute value pair from the object and compare the value of the attribute value pair from the object with the value from the attribute value pair of the update. When the values match, the state of the object is verified with the update. The previous version of the object is verified to the expected version from the update message by matching the previous version to the expected version. The previous version matches the expected version when the values of the previous version and the expected version are the same.

In one embodiment, when the version match is not successful, the current version is verified with the update and a previous version of the object is verified with the expected version to generate a verification. In one embodiment, the verification is successful when the current version of the object accords with the update and the previous version of the object matches the expected version for the object from the update message. The current version may be verified with the update by obtaining a target version of the object (either from the update message or by calculating it from the updated state of the object with the previous version of the object) determining if the target version matches the current version (e.g., has the same value).

In one embodiment, the client that receives the response message discards a collateral response message from a different class of the plurality of classes after receiving the response message. The collateral response message is the response message from the different class, which received a similar update message having the same requested update to the same object.

At Step 208, a response message is generated that includes a current version of the object. The current version may be used by the client in a subsequent update message to identify the previous version of the object.

In one embodiment, the response message is generated with a unicast address for the class. The class may include and listen to both the broadcast address and the unicast address to make updates to the object. Subsequent update messages may be received by the class from the unicast address.

At Step 210, the response message is transmitted. In one embodiment, when the update is successfully applied, the response message is transmitted as a success message. When the update is not successfully applied, the response message may be transmitted as a failure message. The success message indicates that the class updated the object. The failure message indicates that the class did not update the object.

In one embodiment, after the attempt to update the object by the class is not successful, a verification is generated. The verification verifies the state of the object or the current version of the object with the update and verifies the previous version of the object with the expected version from the update message (as discussed above in relation to Step 206). When the update is not successfully applied and the verification is successful, the response message is transmitted as a success message.

In one embodiment, the response message is transmitted from the class concurrent with a different class processing a similar update message from the client. The class and the different class are part of a set of classes that receive similar update messages to make the same update to the object.

In one embodiment, when the update is successfully applied the response message is transmitted as a success message. When the update is not successfully applied and the version match is not successful (also referred to the version match as being a version mismatch), the response message is transmitted as a failure message. When the update is not successfully applied and the version match is successful (indicating that a different class updated the object), no response message is transmitted. By not transmitting a message, the amount of network traffic is reduced on the system.

In one embodiment, after determining that the update was not successfully applied the class may determine if there is a version mismatch by comparing the previous version of the object with the expected version from the update message. After determining a version mismatch (or mismatch), the class may determine if the object has been updated by another class. When the update is not successfully applied and the version match is not successful, the response message is transmitted as a failure message. When the update is not successfully applied, the version match is successful, and the object is not updated by another class, the response message is transmitted as a failure message. When the update is not successfully applied, the version match is successful, and the object is updated by another class, no response message is transmitted to reduce network traffic.

In one embodiment, after determining if the update was successfully applied, the class may determine if there is a version mismatch between the previous version of the object and the expected version from the update message. After determining a version match (or version mismatch), the class may perform a verification by retrieving the object and comparing the state of the object with the update. When the update is successfully applied, the response message is transmitted as a success message. When the update is not successful and the version match is not successful, the response message is not transmitted. When the version match is not successful and the verification is successful, the response message is transmitted as a success message. When the version match is not successful and the verification is not successful, the response message is transmitted as a failure message.

In one embodiment, when the update is successfully applied the response message is transmitted as a success message. When the update is not successfully applied and the version match is not successful, the response message is not transmitted to reduce network traffic (in contrast to a previous embodiment that did not send a response message when the version match is successful). When the update is not successfully applied and the version match is successful, the response message is transmitted as a failure message.

Turning to FIG. 2B, the process (250) may be performed by a client on a server in a cloud computing environment. The client may transmit update messages to broadcast addresses and to unicast addresses of classes to update an object.

At Step 252, an update message is transmitted to a broadcast address of a class. The update message includes an update to an object and an expected version for the object. The update message is transmitted by a client. As an example, the client may be a web service that hosts a website.

At Step 254, a response message is received that includes a unicast address of the class and a current version of the object. The response message may be a success message indicating that the update was successfully applied to the object and may be a failure message indicating that the update may not have been applied to the object. In one embodiment, the current version is a hash value generated from a state of the object and the expected version.

At Step 256, an address cache is updated to include the unicast address from the response message. Unicast addresses may be added to the address cache until an upper threshold for the number of unicast addresses in the address cache is reached. In one embodiment, the address cache is updated to remove a nonresponsive address. A nonresponsive address does not provide a response to the client and indicates that there are no classes listening to that address. In one embodiment, the address cache is updated after a delay threshold is met to remove a timed out address. The delay threshold identifies a duration of time that an address may be held within the address cache. As an example, the delay threshold may be 5 seconds, 30 seconds, 10 minutes, an hour, etc. A timed out address is an address within the address cache that has then in the address cache longer than the delay threshold and will be removed.

At Step 258, a subsequent update message is transmitted to the unicast address (instead of to the broadcast address), to request an update to the object. The subsequent update message may be serviced by the same class that transmitted the response message with the unicast address. The subsequent update message includes the current version of the object as the expected version of the object within the subsequent update message.

FIGS. 3A through 3C illustrate processes of classes to handle update messages received from unicast addresses. The classes may respond with response messages that are success messages and failure messages that include the current version of the object on which the update is attempted.

Turning to FIG. 3A, at Step 302 of the process (300), the class attempts to the update the object. The update is attempted after receiving an update message from a client from a unicast address.

At Step 304, the class determines if the update was successful. The update may not be successful when another class has already updated the object or when a hardware issue (e.g., a memory error, a transmission error, etc.) prevents the update from being successfully performed.

If the update was successful, then at Step 306, the response message is sent as a success message by the class. The success message indicates that the class attempted and succeeded in updating the object.

If the update was not successful, then at Step 308, the response message is sent as a failure message by the class. The failure message indicates that the class attempted but did not succeed in updating the object.

Turning to FIG. 3B, at Step 332 of the process (330), the class attempts to the update the object. The update is attempted after receiving an update message from a client from a unicast address.

At Step 334, the class determines if the update was successful. The update may not be successful when another class has already updated the object or when a hardware issue (e.g., a memory error, a transmission error, etc.) prevents the update from being successfully performed.

If the update was successful, then at Step 336, the response message is sent as a success message by the class. The success message indicates that the class attempted to update the object, that the object was successfully updated, and may coincide with this class as being the class that successfully updated the object.

In one embodiment, the client receiving the success message may continue to listen for and process other response messages from other classes. The client may proceed to a next operation after processing each of the response message from each of the classes to which an update message was sent.

If the update was not successful, then at Step 338, the object is retrieved when there is a version mismatch between the previous version of the object and the expected version from the update message. The version mismatch between the expected version from the update message and the current version of the object may indicate that the object has already been updated by another class.

At Step 340, after retrieving the object, a verification is performed to verify if the object matches the update and if the previous version is the expected version. The object matches the update when the state of the object includes the update from the update message. The match may be determined by comparing the values of the attribute value pairs from the update message and the corresponding attribute value pairs from the object. The previous version of the object and the expected version from the update message may be compared to verify a match between the values of the previous version and the expected version.

At Step 342, it is determined whether the verification is successful. The verification is successful when both the object is verified with the update and the previous version is verified with the expected version.

If the verification was successful, then at Step 336, the response message is sent as a success message by the class. The success message indicates that the class attempted to update the object and that the object was updated even though, in this case, the class did not actually update the object. Rather, another class on the system updated the object.

In one embodiment, the client receiving the success message may discard other response messages from other classes. The client may proceed to a next operation after receiving the first success message from a class.

If the verification was not successful, then at Step 344, the response message is sent as a failure message. The failure message indicates that the class attempted the update and that the class has not been successfully updated by this class or another class.

Turning to FIG. 3C, the process (370) includes steps similar to the steps of the process (330) of FIG. 3B, with the Step 380 of the process (370) of FIG. 3C being different from the Step 340 of the process (330) of FIG. 3B. At Step 372, the class attempts to the update the object. The update is attempted after receiving an update message from a client from a unicast address.

At Step 374, the class determines if the update was successful. The update may not be successful when another class has already updated the object or when a hardware issue (e.g., a memory error, a transmission error, etc.) prevents the update from being successfully performed.

If the update was successful, then at Step 376, the response message is sent as a success message by the class. The success message indicates that the class attempted to update the object, that the object was successfully updated, and may coincide with this class as being the class that successfully updated the object.

If the update was not successful, then at Step 378, the object is retrieved when there is a version mismatch between the previous version of the object and the expected version from the update message. The version mismatch between the expected version from the update message and the current version of the object may indicate that the object has already been updated by another class.

At Step 380, after retrieving the object, a verification is performed to verify if the object version matches with the update and if the previous version is the expected version. In one embodiment, the object version matches the update when the current version of the object matches a target version calculated using the update. For example, after retrieving the object, the update is applied to the local copy of the object and the target version is generate by hashing the state of the updated local copy of the object with the previous version of the object. When the target version matches the current version of the object, the object version matches the update. The previous version of the object and the expected version from the update message may be compared to verify a match between the values of the previous version and the expected version.

At Step 382, it is determined whether the verification is successful. The verification is successful when both the object version is verified with the update and the previous version is verified with the expected version.

If the verification was successful, then at Step 376, the response message is sent as a success message by the class. The success message indicates that the class attempted to update the object and that the object was updated even though, in this case, the class did not actually update the object. Rather, another class on the system updated the object.

If the verification was not successful, then at Step 384, the response message is sent as a failure message. The failure message indicates that the class attempted the update and that the class has not been successfully updated by this class or another class.

FIGS. 4A through 4D illustrate processes of classes that may receive update messages from a broadcast address. The classes may respond with response messages that are success messages and failure messages or may not respond.

Turning to FIG. 4A, at Step 402 of the process (400), the class attempts to the update the object. The update is attempted after receiving an update message from a client from a broadcast address.

At Step 404, the class determines if the update was successful. The update may not be successful when another class has already updated the object or when a hardware issue (e.g., a memory error, a transmission error, etc.) prevents the update from being successfully performed.

If the update was successful, then at Step 406, the response message is sent as a success message by the class. The success message indicates that the class attempted and, in this case, succeeded in updating the object.

If the update was not successful, then at Step 408, the class determines if there is a version mismatch. The version mismatch is determined by comparing the value of the current version of the object with the value of the expected version from the update message. When the values do not match, there is a version mismatch. The values may not match when another class has already updated the object.

If there is a version mismatch (i.e., the expected version does not match the current version), then at Step 410, the response message is sent as a failure message. The failure message indicates that the attempt to update the object by the class was not successful.

If there is not a version mismatch (i.e., the expected version does match the current version), then at Step 412, no response message is sent. The object may have been updated by another class on the system and, by not responding in this case, the amount of network traffic on the system is reduced.

Turning to FIG. 4B, at Step 422 of the process (420), the class attempts to the update the object. The update is attempted after receiving an update message from a client from a broadcast address.

At Step 424, the class determines if the update was successful. The update may not be successful when another class has already updated the object or when a hardware issue (e.g., a memory error, a transmission error, etc.) prevents the update from being successfully performed.

If the update was successful, then at Step 426, the response message is sent as a success message by the class. The success message indicates that the class attempted and, in this case, succeeded in updating the object.

If the update was not successful, then at Step 428, the class determines if there is a version mismatch. The version mismatch is determined by comparing the value of the current version of the object with the value of the expected version from the update message. When the values do not match, there is a version mismatch. The values may not match when another class has already updated the object.

If there is not a version mismatch (i.e., the expected version does match the current version), then at Step 430 the response message is sent as a failure message. The failure message indicates that the attempt to update the object by the class was not successful even though the current version of the object matched the expected version from the update message.

If there is a version mismatch (i.e., the expected version does not match the current version), then at Step 432, the class determines if the object was updated by another class. The determination may be made by verifying the object state includes the update from the update message, verifying the current version of the object is in accordance with the update being applied to the object, and verifying that the expected version from the update message matches to the previous version of the object. When the object state or version accords with the update and the expected version matches to the previous version, the verification is successful, and the class may identify that the object was updated by another class.

If the object was not updated by another class, then at Step 430, the response message is sent as a failure message. The failure message indicates that the attempt to update the object by the class was not successful and that the update has not been applied to the object.

If the object was updated by another class, then at Step 434, no response message is sent. The object has been updated by another class on the system and, by not responding in this case, the amount of network traffic on the system is reduced.

Turning to FIG. 4C, the process (450) includes steps (further described below) similar to the steps of the process (420) of FIG. 4B, with the Step 458 of the process (450) of FIG. 4C having a different outcome from the Step 428 of the process (420) of FIG. 4B. From Step 458, when there is not a version mismatch, the process (450) proceeds to Step 460 and no message is sent. In contrast, from Step 428 of FIG. 4B, when there is not a version mismatch, the process (420) sends a failure message.

At Step 452, the class attempts to the update the object. The update is attempted after receiving an update message from a client from a broadcast address.

At Step 454, the class determines if the update was successful. The update may not be successful when another class has already updated the object or when a hardware issue (e.g., a memory error, a transmission error, etc.) prevents the update from being successfully performed.

If the update was successful, then at Step 456, the response message is sent as a success message by the class. The success message indicates that the class attempted and that the object has been updated.

If the update was not successful, then at Step 458, the class determines if there is a version mismatch. The version mismatch is determined by comparing the value of the current version of the object with the value of the expected version from the update message. When the values do not match, there is a version mismatch. The values may not match when another class has already updated the object.

If there is not a version mismatch (i.e., the expected version does match the current version), then at Step 460, no response message is sent. The object has been updated by another class on the system and, by not responding in this case, the amount of network traffic on the system is reduced.

If there is a version mismatch (i.e., the expected version does not match the current version), then at Step 462, the object is retrieved. The object may be retrieved from the repository by the class in response to the version mismatch.

At Step 464, after retrieving the object, a verification is performed to verify if the object matches the update and if the previous version is the expected version. The object matches the update when the state of the object includes the update from the update message. The match may be determined by comparing the values of the attribute value pairs from the update message and the corresponding attribute value pairs from the object. The previous version of the object and the expected version from the update message may be compared to verify a match between the values of the previous version and the expected version.

In one embodiment, the object version may be determined to match the update as part of the verification. For example, after retrieving the object, the update is applied to the local copy of the object and the target version is generate by hashing the state of the updated local copy of the object with the previous version of the object. When the target version matches the current version of the object, the object version matches the update.

At Step 466, it is determined whether the verification is successful. The verification is successful when both the object (or object version) is verified with the update and the previous version is verified with the expected version.

If the verification was successful, then at Step 456, the response message is sent as a success message by the class. The success message indicates that the class attempted to update the object and that the object was updated even though, in this case, the class did not actually update the object. Rather, another class on the system updated the object.

If the verification was not successful, then at Step 468, the response message is sent as a failure message. The failure message indicates that the class attempted the update and that the class has not been successfully updated by this class.

Turning to FIG. 4D, the process (480) includes steps (further described below) similar to the steps of the process (400) of FIG. 4A, with the Step 488 of the process (480) of FIG. 4D having a different outcome from the Step 408 of the process (400) of FIG. 4A (the "yes" and "no" paths are reversed).

At Step 482, the class attempts to the update the object. The update is attempted after receiving an update message from a client from a broadcast address.

At Step 484, the class determines if the update was successful. The update may not be successful when another class has already updated the object or when a hardware issue (e.g., a memory error, a transmission error, etc.) prevents the update from being successfully performed.

If the update was successful, then at Step 486, the response message is sent as a success message by the class. The success message indicates that the class attempted and, in this case, succeeded in updating the object.

If the update was not successful, then at Step 488, the class determines if there is a version mismatch. The version mismatch is determined by comparing the value of the current version of the object with the value of the expected version from the update message. When the values do not match, there is a version mismatch. The values may not match when another class has already updated the object.

If there is not a version mismatch (i.e., the expected version does match the current version), then at Step 490, the response message is sent as a failure message. The failure message indicates that the attempt to update the object by the class was not successful.

If there is a version mismatch (i.e., the expected version does not match the current version), then at Step 492, no response message is sent. The object may have been updated by another class on the system and, by not responding in this case, the amount of network traffic on the system is reduced.

Turning to FIG. 5, the process (500) may operate on a client on a server in a cloud computing environment. The client that may transmit update messages to broadcast addresses or unicast addresses. The classes listening to the broadcast addresses may respond with response messages that include unicast addresses for subsequent transmissions from the client. The client maintains an address cache with a lower threshold and an upper threshold on the number of unicast addresses to use and switches between a broadcast mode and a unicast mode. A delay threshold may also be used to remove addresses from the address cache after a period of time.

At Step 502, the client determines if the broadcast mode is the transmission mode. If not, then the process (500) proceeds to Step 512. Otherwise, the process (500) proceeds to Step 522.

At Step 512, the client determines if the number of addresses in the address cache is meets the lower threshold. The lower threshold may be met when the number of addresses in the address cache is less than the value of the lower threshold. If the lower threshold is met, then the process (500) proceeds to Step 514 and otherwise the process proceeds to Step 526.

At Step 514, the broadcast mode is set as the transmission mode. Setting the transmission mode to the broadcast mode has the class transmit future messages using the broadcast address instead of the unicast addresses in the address cache.

At Step 516, a broadcast message is sent. The broadcast message may be an update message that is transmitted to the broadcast address that is listened to by multiple classes for accessing an object. The broadcast message may also be a read message requesting to retrieve data from the object for the client.

At Step 518, broadcast response messages are received. A broadcast response message may be received from each of the classes that were listening to the broadcast address to which the broadcast message was transmitted. The broadcast response messages may each include a unicast request address for the class that transmitted the response message.

At Step 520, the address cache is updated. The address cache may be updated to include the unicast addresses from the broadcast response messages. The address cache may also be updated to remove address for which no response or an error message was received and to remove addresses that have been in the address cache longer than the delay threshold.

At Step 522, after identifying that the transmission mode is set as the broadcast mode, the client determines if the number of addresses in the address cache meets the upper threshold. The upper threshold may be met when the number of addresses in the address cache is greater than or equal to the value of the upper threshold. If the upper threshold is met, then the process (500) proceeds to Step 524 and otherwise proceeds to Step 516.

At Step 524, the unicast mode is set as the transmission mode. Setting the transmission mode to the unicast mode has the class transmit future messages using the unicast addresses for the classes instead of the broadcast address.

At Step 526, a unicast message is sent. The unicast message may be an update message that is transmitted to the unicast address for a single class for accessing an object. The unicast message may also be a read message requesting to retrieve data from the object for the client.

At Step 528, unicast response messages are received. A unicast response message may be received from each of the classes to which the update messages were sent.

At Step 530, the address cache is updated. The address cache be updated to remove address for which no response or an error message was received and to remove addresses that have been in the address cache longer than the delay threshold.

At Step 532, the client determines if the response messages received from the classes indicate success. When at least one of the response messages is a success message, the process (500) proceeds to the Step 534. Otherwise the process (500) receipts to the Step 536.

At Step 534, the client proceeds to perform the next operation. The next operation may be a request or an update request for which a read message or update message is sent by the client using the transmission mode that was previously set.

At Step 536, the operation is remediated. Since a successful response was not received, the present operation that was requested by the client, in the broadcast or unicast messages sent by the client, was not successful and the client may take remedial action. The remedial action may include repeating the same operation (e.g., repeat the same read or update request by transmitting the same broadcast or unicast messages) or to present an error message.

Figure 6:
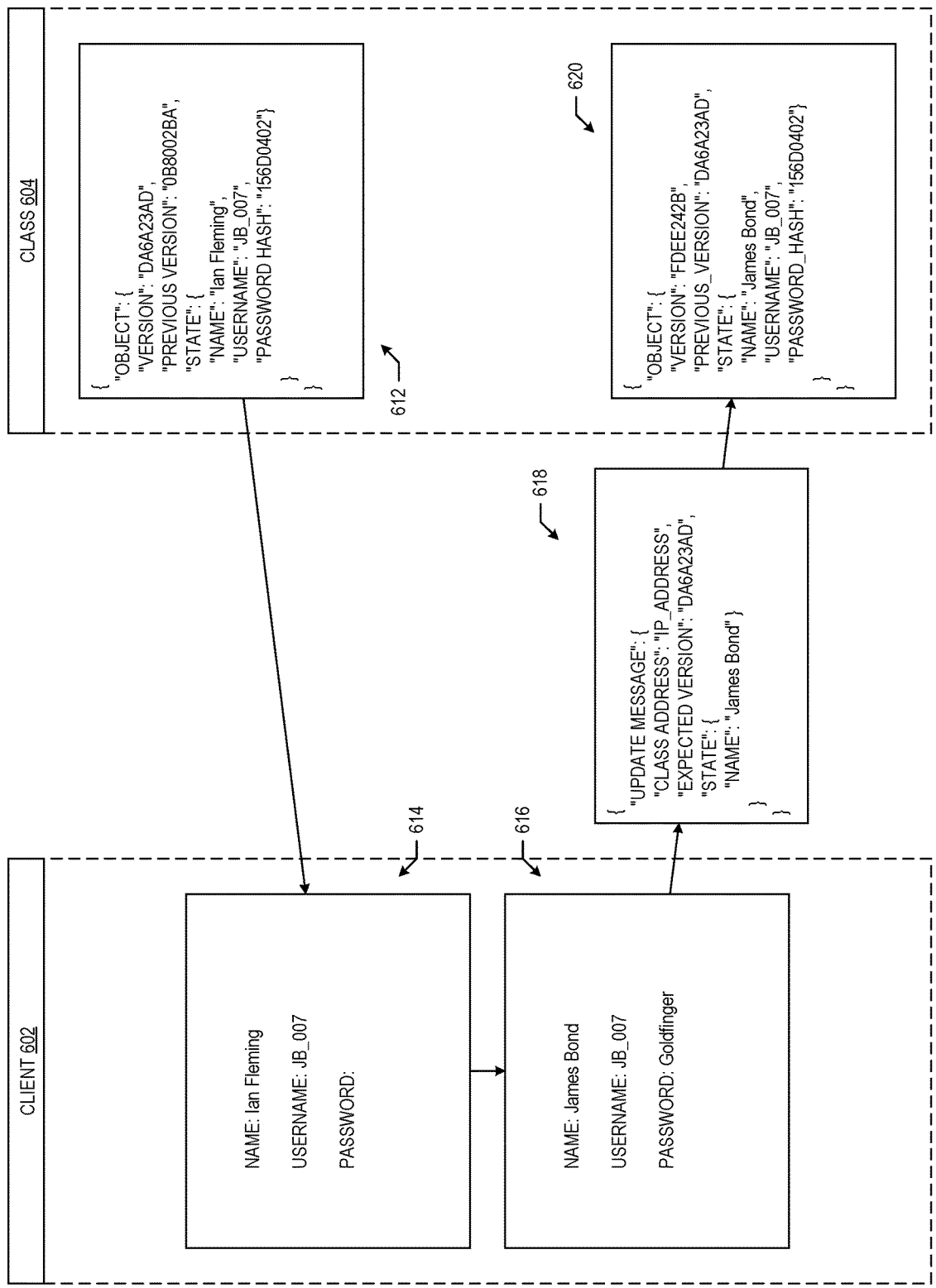
FIG. 6 shows an example in accordance with disclosed embodiments.

FIG. 6 shows an example of systems and sequences that update and present objects in accordance with the disclosure. The embodiments shown in FIG. 6 may be combined and may include or be included within the features and embodiments described in the other figures of the application. The features and elements of FIG. 6 are, individually and as a combination, improvements to the technology of computing systems and machine learning systems. The various features, elements, widgets, components, and interfaces shown in FIG. 6 may be omitted, repeated, combined, and/or altered as shown. Accordingly, the scope of the present disclosure should not be considered limited to the specific arrangements shown in FIG. 6.

Turning to FIG. 6, the client (602) communicates with the class (604) 2 present and update a website based on information in a repository. The client (602) and the class (604) communicate by passing messages as part of a RESTful API.

In response to a request from the client (602), the class (604) retrieves the object (612) from a repository. The object (612) includes nested attribute value pairs with fields for a name, a username, and a password hash of a user of the system. The repository stores a password hash instead of the password itself to maintain security of the password. The version of the object (612) is formed by hashing the state (including username, and password hash attribute value pairs) concatenated with the previous version with a hash function. After retrieving the object (612), the class (604) transmits the object (612) to the client (602).

The client (602) receives the object (612) from the class (604) to generate the web page (614). The web page (614) presents information from the state of the object (612) including the name and username but does not include the actual password.

The client (602) communicates with the user through a browser and generates the updated web page (616). For example, the user changed the name from the object (612) from "Ian Fleming" to "James Bond" and provides the correct password "Goldfinger".

The client (602) generates the update message (618) to update the object (612). The update message (618) includes a class address that is a network address for the class (604), which may be a broadcast address or unicast address. The update message (618) also includes the expected version (with a value of "da6a23ad") for the object (612), which matches with the version of the object (612). The update message (618) also includes the information to be updated in the object (612), which is the name within the state of the object (612) (being updated to "James Bond"). The client (602) transmits the update message (618) to the class (604).

The class (604) receives the update message (618) and successfully updates the object (612) to form the updated object (620). The updated object (620) includes an updated version ("fdee242b") and an updated previous version ("da6a23ad"). The updated previous version has the same value as the version from the object (612). The updated version of the updated object (620) is generated by hashing the state of the updated object (610) (including the updated name) concatenated with the previous version. After updating the object (612) to form the updated object (620), the class (604) may send a success message to the client (602) to indicate that the update was successful.

Embodiments of the invention may be implemented on a computing system. Any combination of a mobile, a desktop, a server, a router, a switch, an embedded device, or other types of hardware may be used. For example, as shown in FIG. 7A, the computing system (700) may include one or more computer processor(s) (702), non-persistent storage (704) (e.g., volatile memory, such as a random access memory (RAM), cache memory), persistent storage (706) (e.g., a hard disk, an optical drive such as a compact disk (CD) drive or a digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) (702) may be one or more cores or micro-cores of a processor. The computing system (700) may also include one or more input device(s) (710), such as a touchscreen, a keyboard, a mouse, a microphone, a touchpad, an electronic pen, or any other type of input device.

The communication interface (712) may include an integrated circuit for connecting the computing system (700) to a network (not shown) (e.g., a local area network (LAN), a wide area network (WAN) such as the Internet, a mobile network, or any other type of network) and/or to another device, such as another computing device.

Further, the computing system (700) may include one or more output device(s) (708), such as a screen (e.g., a liquid crystal display (LCD), a plasma display, a touchscreen, a cathode ray tube (CRT) monitor, a projector, or other display device), a printer, an external storage, or any other output device. One or more of the output device(s) (708) may be the same or different from the input device(s) (710). The input and output device(s) (710 and 708) may be locally or remotely connected to the computer processor(s) (702), non-persistent storage (704), and persistent storage (706). Many different types of computing systems exist, and the aforementioned input and output device(s) (710 and 708) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7A:
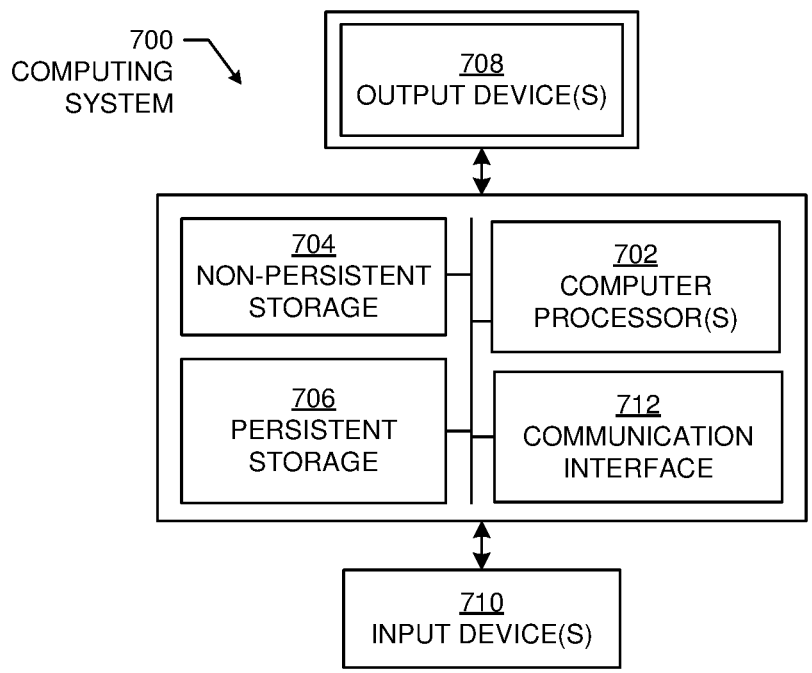
FIG. 7A and FIG. 7B show computing systems in accordance with disclosed embodiments.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system (700) shown in FIG. 7A, or a group of nodes combined may correspond to the computing system (700) shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Figure 7B:
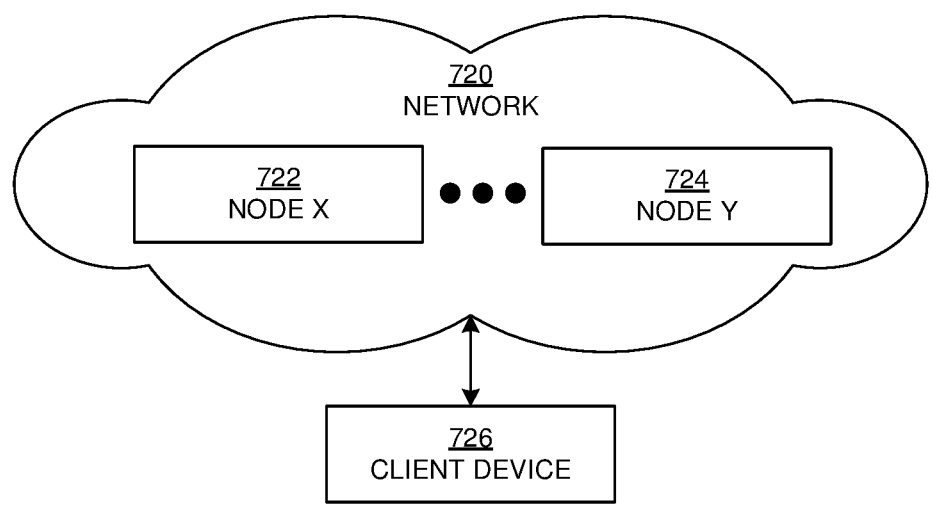

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system (700) shown in FIG. 7A. Further, the client device (726) may include and/or perform all or a portion of one or more embodiments of the invention.

The computing system (700) or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (700) of FIG. 7A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (700) of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (700) of FIG. 7A and the nodes (e.g., node X (722), node Y (724)) and/or client device (726) in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, by a class of a plurality of classes that service an object stored in a data repository, an update message from a broadcast address to which a client transmitted the update message via a distributed system, the update message comprising an update to the object and an expected version for the object,
   wherein the expected version identifies a version of the object that the client is attempting to update with the update message, and
   wherein the class comprises a computer executed process that services update messages from the client by updating the object in the data repository;
applying, by the class when a version match between the expected version and a current version of the object is successful, the update to the object stored in the data repository;
generating a response message comprising the current version of the object;
transmitting the response message to the client,
   wherein, when the update is successfully applied, the response message is transmitted as a success message,
   wherein, when the update is not successfully applied, the response message is transmitted as a failure message,
   wherein, when the update is not successfully applied and the version match is not successful, the response message is transmitted as the failure message, and
   wherein, when the update is not successfully applied and the version match is successful, no response message is transmitted.

2. The method of claim 1, further comprising:
receiving the update message of a plurality of update messages sent concurrently from a plurality of clients; and
transmitting the response message, wherein the success message indicates that the class updated the object and wherein the failure message indicates that the class did not update the object.

3. The method of claim 1, further comprising:
verifying, when the version match is not successful, a state of the object with the update and a previous version of the object with the expected version to generate a verification; and
transmitting the response message,
   wherein, when the update is not successfully applied and the verification is successful, the response message is transmitted as the success message.

4. The method of claim 1, further comprising:
generating the current version as a hash value from an updated state of the object and a previous version of the object.

5. The method of claim 1, further comprising:
verifying, when the version match is not successful, the current version with the update and a previous version of the object with the expected version to generate a verification; and
transmitting the response message,
  wherein, when the update is not successfully applied and the verification is successful, the response message is transmitted as the success message and the client receiving the response message discards a collateral response message from a different class of the plurality of classes after receiving the response message.

6. The method of claim 1, further comprising:
receiving the update message wherein the update message is received as part of a representational state transfer application programming interface (RESTful API), wherein the update message is formatted with a data format using human readable text to define data objects with attribute value pairs, and wherein the data format is JavaScript object notation (JSON); and
transmitting the response message from the class concurrent with a different class of the plurality of classes processing a similar update message from the client.

7. The method of claim 1, further comprising:
transmitting the response message,
  wherein, when the update is not successfully applied and the version match is not successful, the response message is transmitted as the failure message,
  wherein, when the update is not successfully applied, the version match is successful, and the object is not updated by another class of the plurality of classes, the response message is transmitted as the failure message, and
  wherein, when the update is not successfully applied, the version match is successful, and the object is updated by another class, no response message is transmitted.

8. The method of claim 1, further comprising:
verifying, when the current version does not match the expected version, a state of the object with the update to generate a verification;
transmitting the response message,
  wherein, when the version match is not successful, the response message is not transmitted,
  wherein, when the version match is not successful and the verification is successful, the response message is transmitted as the success message, and
  wherein, when the version match is not successful and the verification is not successful, the response message is transmitted as the failure message.

9. The method of claim 1, further comprising:
transmitting the response message,
  wherein, when the version match is not successful, the response message is not transmitted, and
  wherein, when the version match is successful and the update is not successfully applied, the response message is transmitted as the failure message.

10. The method of claim 1, further comprising:
generating the response message with a unicast address for the class, wherein the class comprises the broadcast address and the unicast address; and
receiving a subsequent update message from the unicast address.

11. A system comprising:
a server comprising one or more processors and one or more memories; and
a class, executing on one or more processors of the server, configured for:
  receiving, by a class of a plurality of classes that service an object stored in a data repository, an update message from a broadcast address to which a client transmitted the update message via a distributed system, the update message comprising an update to the object and an expected version for the object,
    wherein the expected version identifies a version of the object that the client is attempting to update with the update message, and
    wherein the class comprises a computer executed process that services update messages from the client by updating the object in the data repository;
  applying, by the class when a version match between the expected version and a current version of the object is successful, the update to the object stored in the data repository;
  generating a response message comprising the current version of the object;
  transmitting the response message to the client,
    wherein, when the update is successfully applied, the response message is transmitted as a success message,
    wherein, when the update is not successfully applied, the response message is transmitted as a failure message,
    wherein, when the update is not successfully applied and the version match is not successful, the response message is transmitted as the failure message, and
    wherein, when the update is not successfully applied and the version match is successful, no response message is transmitted.

12. The system of claim 11, wherein the class is further configured for:
receiving the update message of a plurality of update messages sent concurrently from a plurality of clients; and
transmitting the response message, wherein the success message indicates that the class updated the object and wherein the failure message indicates that the class did not update the object.

13. The system of claim 11, wherein the class is further configured for:
verifying, when the version match is not successful, a state of the object with the update and a previous version of the object with the expected version to generate a verification; and
transmitting the response message,
  wherein, when the update is not successfully applied and the verification is successful, the response message is transmitted as the success message.

14. The system of claim 11, wherein the class is further configured for:
generating the current version as a hash value from an updated state of the object and a previous version of the object.

15. The system of claim 11, wherein the class is further configured for:
verifying, when the version match is not successful, the current version with the update and a previous version of the object with the expected version to generate a verification; and
transmitting the response message,
  wherein, when the update is not successfully applied and the verification is successful, the response message is transmitted as success message and the client receiving the response message discards a collateral response message from a different class of the plurality of classes after receiving the response message.

16. The system of claim 11, wherein the class is further configured for:
receiving the update message wherein the update message is received as part of a representational state transfer application programming interface (RESTful API), wherein the update message is formatted with a data format using human readable text to define data objects with attribute value pairs, and wherein the data format is JavaScript object notation (JSON); and
transmitting the response message from the class concurrent with a different class of the plurality of classes processing a similar update message from the client.

17. A method comprising:
transmitting, by a client, an update message to a broadcast address of a class via a distributed system, wherein the update message comprises an update to an object stored in a data repository and an expected version for the object,
wherein the expected version identifies a version of the object that the client is attempting to update with the update message, and
wherein the class comprises a computer executed process that services update messages from the client by updating the object in the data repository;
receiving a response message comprising a unicast address of the class and a current version of the object,
wherein, when the update is successfully applied, the response message is received as a success message, and
wherein the current version is a hash value generated from a state of the object and the expected version;
updating an address cache to include the unicast address from the response message;
updating the address cache after a delay threshold is met to remove a timed out address;
updating the address cache to remove a nonresponsive address; and
transmitting a subsequent update message to the unicast address, the subsequent update message comprising the current version.

* * * * *